March 1, 1927.                                                              1,618,982
W. HAHNEMANN ET AL
DEVICE FOR THE PRODUCTION OF MECHANICAL VIBRATIONS BY MEANS OF
A CONTINUOUS STREAM OF FLUID
Filed June 1, 1925
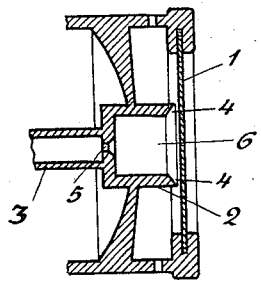
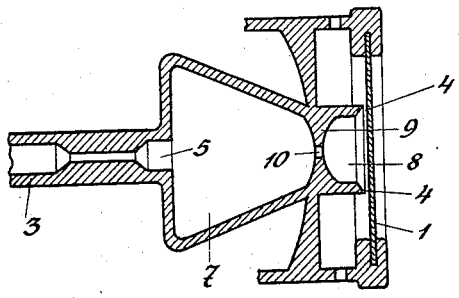
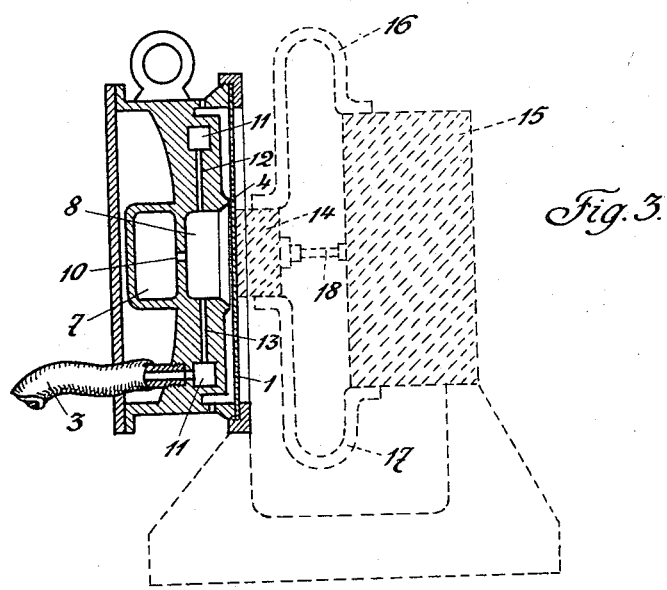
Inventor:
Walter Hahnemann
Wilhelm Rudolph
Ernst Wilckens
Attorney Patented Mar. 1, 1927.

1,618,982

UNITED STATES PATENT OFFICE.

WALTER HAHNEMANN, OF KITZEBERG, NEAR KIEL, AND WILHELM RUDOLPH AND ERNST WILCKENS, OF KIEL, GERMANY, ASSIGNORS TO SIGNAL GESELLSCHAFT MIT BESCHRANKTER HAFTUNG, OF KIEL, GERMANY, A FIRM.

DEVICE FOR THE PRODUCTION OF MECHANICAL VIBRATIONS BY MEANS OF A CONTINUOUS STREAM OF FLUID.

Application filed June 1, 1925, Serial No. 34,264, and in Germany June 13, 1924.

The invention relates to a device in which vibrations of a mechanical system are produced by means of a continuous stream of fluid actuating the said system. Devices of this kind hitherto known are constructed so that the mechanical system to be acted upon is situated in the path of the fluid and is caused to vibrate thereby and by its reaction controls the flow of the stream of fluid. The particular use to which the vibrations of the said system are put does not affect the scope of the invention. In the past the principle above described usually has been applied to acoustical signalling apparatus. The following invention shall not be limited to signalling devices but may be used for all purposes where mechanical energy has to be consumed in the form of mechanical vibrations, for instance besides signalling for testing materials by means of vibratory apparatus, for producing alternating currents, for compensating the phase angle between current and tension in alternating current lines and so on.

It has already been proposed for devices of the kind described above to insert a resonator into fluid supply pipe near the nozzle, i. e. between the supply pipe and the mechanical system acted upon.

The invention refers to a device of this kind and consists in a second opening being provided in the wall of this resonator, besides the nozzle, the size of this opening being approximately equal to the size of the nozzle itself. In resonators consisting of a chamber with an opening there exists a definite relation between the volume of the chamber and the size of the opening on one hand and the natural frequency of the resonator on the other hand. In consequence of this fact there can be no definite natural frequency of the resonator if the size of the opening is variable. In the case where the vibrations of the mechanical system would have the same amplitude under all circumstances the mean size of the nozzle opening could be considered as size of the opening of the resonator governing its natural frequency. But, setting aside the fact that such a calculation would be nothing more than a rough estimation, in practice the vibration magnitude of the amplitude of the vibratory system need not be invariable. On the contrary in the most cases, for instance if devices of this kind are used for the production of signals of differing loudness, or for testing materials with various stresses or for producing alternating currents of various intensities the amplitude of vibration has to be variable within a rather large range. From these considerations arises the problem of the invention reading: Besides the variable opening of the nozzle there has to exist another opening in the resonator the influence of which upon the natural frequency of the resonator is greater than that of the nozzle itself. If on the other hand this influence of the additional opening is too great, the variations of the size of the nozzle opening caused by the vibrations of the vibratory structure controlling the nozzle will not influence sufficiently the pressure of the medium within the resonator. Therefore there exists an optimum ratio between the size of the two said openings which, as has been found in practice, is the before mentioned ratio according to which the size of the constant additional opening has to be approximately equal to the mean size of the nozzle opening.

Further particulars of the invention will be spoken about in connection with the accompanying drawing, in which Figs. 1 and 2 show the object of the invention applied to a signalling apparatus with vibrating diaphragm and Fig. 3 a dynamic material testing machine with a resonator according to the invention.

The apparatus shown in Fig. 1 comprises a diaphragm 1 closely opposed to a vessel 2 representing a resonator of about the same pitch as the diaphragm. The agitating medium flows from the feeding tube 3 through the vessel 2 to the nozzle opening 4. All these elements in this combination are known in the art and the invention consists only in that the inlet opening 5 is so dimensioned that the natural frequency of the resonator 6 is substantially controlled by the constant opening 5. Generally it will be sufficient to equalize the two openings 4 and 5.

In some cases there may arise the difficulty that the opening 5 has to become rather small. For the efficiency of the apparatus, on the other hand, it is important that the inlet opening 5 has no throttling effect upon the fluid stream. If a relatively high static pressure has to exist in the resonator chamber, generally it is not possible to equalize the two openings. In this case an arrangement may be helpful such as shown in Fig. 2. Instead of a single room resonator there is applied a dual chamber resonator. The dual chamber resonator itself is not the object of the invention but is claimed in the U. S. Patent No. 1,528,418. The resonator comprises two chambers 7 and 8 separated from one another by a rigid wall 9. This wall has a sound conducting opening 10, corresponding in its effect upon the pitch of the resonator to the opening 5 in Fig. 1. The influence upon the vibratory properties of the resonator of the inlet opening 5 in Fig. 2, which now represents practically only an inlet for the medium is greatly diminished compared with the influence of the opening 10 and the nozzle, and its dimensions consequently are of no importance upon the pitch of the resonator.

Certainly it may be possible that also in this case the opening 10 has a throttling effect upon the stream of medium. Free from this disadvantage is an apparatus according to Fig. 3. The resonator 7, 8 is a dual chamber resonator exactly as in Fig. 2 but the medium does not pass through both the chambers 7 and 8 but only through the chamber 8. For the purpose of preventing the inlets for the medium stream from being limited in any way with reference to their form and size for reasons of their oscillatory functions they are so performed as to annihilate any vibrations in connection with the vibrations of the medium within the resonator. Means for damping such oscillations in holes or tubes are well known in the art, for instance, materials or bodies may be arranged within the inlet leadings which are adapted to damp the oscillations by friction or the like. In the example of Fig. 3 an especially exact way to accomplish this effect has been found. The actuating medium is led through the feeding tube 3 to an annular channel 11 which is connected to the chamber 8 of the dual resonator by a number of long and narrow channels 12, 13 extending in radial directions. The narrowness of the channels prevents the medium in them from vibrating. To be entirely on the safe side the length of the channels may be so dimensioned that their own natural frequency, which easily can be calculated, differs as much as possible from the natural frequency of the dual chamber resonator.

If the apparatus shown in Fig. 3 is used without the parts drawn in dotted lines and if the natural frequency of the diaphragm coincides with the natural frequency of the resonator, its effect is that of a sound producing apparatus. In connection with the said dotted-lined parts the Fig. 3 represents a material testing machine to demonstrate the principle of the invention applied to another form of apparatus. The material testing machine proper consists of two large masses 14 and 15 connected together by an elastic member 16, 17, a combination representing a mechanical vibratory system per se. The material to be tested is fastened between the masses 14 and 15 in form of a rod 18. The dynamic machine itself for testing material is not the object of the invention but is claimed in patent application Serial No. 494,575. For this form of the vibrating machine the elastic force (the strength) of the diaphragm and the bent springs 16, 17 have to be so dimensioned that the natural frequency of the vibratory structure composed of the parts 1, 16, 17, 14, 15 is approximately equal to the natural frequency of the resonator 7, 8, or the elastic force of the diaphragm 1 must be small compared with the elastic force of the parts 16, 17 under equal resonance relations between the said structure and the resonator, or the diaphragm 1 may be entirely dispensed with and replaced by a rigid nozzle plate free towards all directions and connected only to the mass 14.

The character of the medium used for driving such apparatus is of no importance for the scope of the invention; it may be a liquid or a gas. It may be understood that in each case the calculation of the volume of the resonators and their openings depends upon the physical constants of the medium made use of.

Instead of making the medium influence directly the working part (f. i. the diaphragm) means for enhancing or diminishing the motion or pressure amplitude may be interconnected between the nozzle and the said working part.

We claim:—

1. In a device for the production of mechanical vibrations by means of a stream of fluid the combination of a mechanical vibratory structure; a resonator; a nozzle opening in the wall of the resonator controlled by the vibrations of the said mechanical vibratory structure, a second opening in the wall of the said resonator; and a feeding tube for the fluid connected to the said resonator.

2. In a device for the production of mechanical vibrations by means of a stream of fluid a resonator with two openings of approximately equal size in its walls one of the said openings to perform as a nozzle; a mechanical vibratory structure in operative connection with the nozzle; and a feeding tube for the fluid connected to the said resonator.

3. In a device for the production of mechanical vibrations by means of a stream of fluid a resonator, an opening in the wall of the said resonator to perform as nozzle; a mechanical vibratory structure in operative connection with the nozzle; a second opening in the wall of the resonator so dimensioned with relation to the first opening as to substantially influence the natural frequency of the resonator; and a feeding tube for the fluid connected to the said resonator.

4. In a device for the production of mechanical vibrations by means of a stream of fluid a resonator, an opening in the wall of the said resonator to perform as a nozzle of predetermined size; a mechanical vibratory structure controlling the size of the nozzle during vibration; a second opening in the wall of the resonator approximately equal in its size to the mean size of the nozzle opening during vibration of the said vibratory structure; and a feeding tube for the said fluid connected to the resonator.

5. In a device for the production of mechanical vibrations by means of a stream of fluid a resonator and a mechanical vibratory structure both the resonator and the structure having substantially the same natural frequency; an opening in the wall of the said resonator to perform as a nozzle of predetermined size and controlled in its size by the said vibratory structure during vibration; a second opening in the wall of the resonator approximately equal in its size to the mean size of the nozzle opening during vibration of the said vibratory structure; and a feeding tube for the said fluid connected to the resonator.

6. In a device for the production of mechanical vibrations by means of a stream of fluid the combination of a resonator comprising two compartments connected by a sound passage and having a nozzle opening in its outer wall of one of the two compartments with a mechanical vibratory structure in operative connection with the said nozzle opening; and a feeding tube for the said fluid connected to the resonator.

7. In a device for the production of mechanical vibrations by means of a fluid a resonator formed of two individual compartments connected by a sound passage; an opening in the outer wall of one of the said compartments and to perform as a nozzle; a mechanical vibratory structure operated by the fluid passing through the said nozzle and controlling the size of the said nozzle during vibration; and a feeding tube for the said fluid connected to the resonator; the size of the said sound passage being approximately equal to the mean size of the nozzle during vibration.

8. In a device for the production of mechanical vibrations by means of a fluid a resonator formed of two individual compartments connected by a sound passage; an opening in the outer wall of one of the said compartments to perform as a nozzle; a mechanical vibratory structure operated by the fluid passing through the said nozzle and controlling the size of the said nozzle during vibration; and a feeding tube for the said fluid connected to the said resonator, the said sound passage being so dimensioned with relation to the size of the nozzle opening as to substantially influence the natural frequency of the resonator.

9. In a device for the production of mechanical vibrations by means of a stream of fluid the combination of a resonator comprising two compartments connected by a sound passage and having a nozzle opening in the outer wall of one of the two compartments with a mechanical vibratory structure in operative connection with the said nozzle opening; and a feeding tube for the said fluid connected to one of the said two compartments and so dimensioned in the vicinity of the resonator as to prevent the fluid from vibrating.

10. In a device for the production of mechanical vibrations by means of a stream of fluid the combination of a resonator comprising two compartments connected by a sound passage and having a nozzle opening in the outer wall of one of the two compartments with a diaphragm in operative connection with the said nozzle opening; and a feeding tube for the said fluid connected to the compartment facing the said diaphragm; the size of the said sound passage being approximately equal to the mean size of the nozzle opening during vibration; and the resonator and the diaphragm being tuned to substantially the same natural frequency.

11. In a device for the production of mechanical vibrations by means of a stream of fluid the combination of a resonator comprising two compartments connected by a sound passage and having a nozzle opening in the outer wall of one of the said compartments; with a diaphragm in operative connection with the said nozzle; and a feeding tube for the said fluid connected to one of the said openings and subdivided into a number of narrow tubes.

In testimony whereof we affix our signatures.

WALTER HAHNEMANN.
WILHELM RUDOLPH.
ERNST WILCKENS.